(12) United States Patent
Liu

(10) Patent No.: US 11,688,906 B2
(45) Date of Patent: Jun. 27, 2023

(54) BATTERY BOX

(71) Applicant: Shenzhen Eigate Technology Co., Ltd., Shenzhen (CN)

(72) Inventor: Tuanfang Liu, Shenzhen (CN)

(73) Assignee: SHENZHEN EIGATE TECHNOLOGY CO., LTD., Shenzhen (CN)

( * ) Notice: Subject to any disclaimer, the term of this patent is extended or adjusted under 35 U.S.C. 154(b) by 353 days.

(21) Appl. No.: 17/037,797

(22) Filed: Sep. 30, 2020

(65) Prior Publication Data

US 2021/0367219 A1 Nov. 25, 2021

(30) Foreign Application Priority Data

May 21, 2020 (CN) .......................... 202010434972.7
May 21, 2020 (CN) .......................... 202020872076.4

(51) Int. Cl.
*A24F 40/95* (2020.01)
*A24F 40/40* (2020.01)
*H01M 50/147* (2021.01)

(52) U.S. Cl.
CPC ........... *H01M 50/147* (2021.01); *A24F 40/40* (2020.01); *A24F 40/95* (2020.01)

(58) Field of Classification Search
CPC .. H01M 50/20; H01M 50/147; H01M 50/247; H01M 50/262; A24F 40/40; A24F 40/95; A61M 15/06; A61M 2205/8206
See application file for complete search history.

(56) References Cited

U.S. PATENT DOCUMENTS

| | | | | |
|---|---|---|---|---|
| 9,508,965 | B1* | 11/2016 | Zhang | H01M 50/209 |
| 2005/0026035 | A1* | 2/2005 | Ishikawa | H01M 50/264 |
| | | | | 206/703 |
| 2008/0076015 | A1* | 3/2008 | Tien | H01M 50/20 |
| | | | | 429/100 |
| 2010/0040946 | A1* | 2/2010 | Tsuji | H01M 50/262 |
| | | | | 429/175 |
| 2012/0227753 | A1* | 9/2012 | Newton | A24F 40/95 |
| | | | | 131/347 |
| 2014/0299492 | A1* | 10/2014 | Liu | A24F 15/01 |
| | | | | 206/264 |
| 2014/0354879 | A1* | 12/2014 | Sohn | H04N 23/51 |
| | | | | 429/100 |
| 2017/0027221 | A1* | 2/2017 | Liu | H02J 7/0044 |
| 2017/0283138 | A1* | 10/2017 | Mori | H01M 50/271 |
| 2019/0024406 | A1* | 1/2019 | Zhang | H01M 50/262 |
| 2019/0223499 | A1* | 7/2019 | Ouyang | H01M 50/107 |
| 2020/0119318 | A1* | 4/2020 | Okuoka | H01M 50/20 |
| 2021/0120870 | A1* | 4/2021 | Zhu | A24F 40/10 |

* cited by examiner

*Primary Examiner* — Imran Akram
(74) *Attorney, Agent, or Firm* — Matthias Scholl P.C.; Matthias Scholl

(57) ABSTRACT

A battery box, including an end cover, a housing, and an elastic connector. The end cover is disposed on the housing and is connected to the housing via the elastic connector. The elastic connector is configured to control the opening and closing of the end cover with respect to the housing.

3 Claims, 3 Drawing Sheets

BATTERY BOX

CROSS-REFERENCE TO RELATED APPLICATIONS

Pursuant to 35 U.S.C. § 119 and the Paris Convention Treaty, this application claims foreign priority to Chinese Patent Application No. 202010434972.7 filed on May 21, 2020, and to Chinese Patent Application No. 202020872076.4 filed on May 21, 2020. The contents of all of the aforementioned applications, including any intervening amendments thereto, are incorporated herein by reference.

BACKGROUND

The disclosure relates to a battery box.

A conventional battery box comprises an end cover and a housing. The end cover is connected to the housing through a rigid structure, such as a hinge or a buckle. The rigid structure tends to break off during the opening and closing of the end cover with respect to the housing.

SUMMARY

The disclosure provides a battery box, comprising an end cover, a housing, and an elastic connector; the end cover is disposed on the housing and is connected to the housing via the elastic connector; the elastic connector is configured to control an opening and closing of the end cover with respect to the housing.

In a class of this embodiment, the elastic connector comprises a spring, a rotation shaft, and a rivet; the spring is disposed around the rotation shaft; the rotation shaft comprises a first end and a second end; the rivet is disposed on the first end to fix the spring; the rotation shaft runs through the end cover and two ends of the rotation shaft are exposed out of the end cover; and the spring is configured to control the opening and closing of the end cover.

In a class of this embodiment, the elastic connector further comprises a steel piece and a support; the support comprises a positioning slot and the steel piece is vertically disposed in the positioning slot to prevent an automatic opening and closing of the end cover.

In a class of this embodiment, the support is fixed in the housing; the second end of the rotation shaft is disposed in the housing.

In a class of this embodiment, the elastic connector further comprises a first magnet and a second magnet; the first magnet is disposed in an inner side of the end cover; the second magnet is disposed on the support; a magnetic attraction force between the first magnet and the second magnet strengths the closing of the end cover.

In a class of this embodiment, the elastic connector further comprises a third magnet disposed on one side of the support and configured to attract an electronic cigarette in a charging state.

DETAILED DESCRIPTION

To further illustrate, embodiments detailing a battery box are described below. It should be noted that the following embodiments are intended to describe and not to limit the disclosure.

Figure 1:
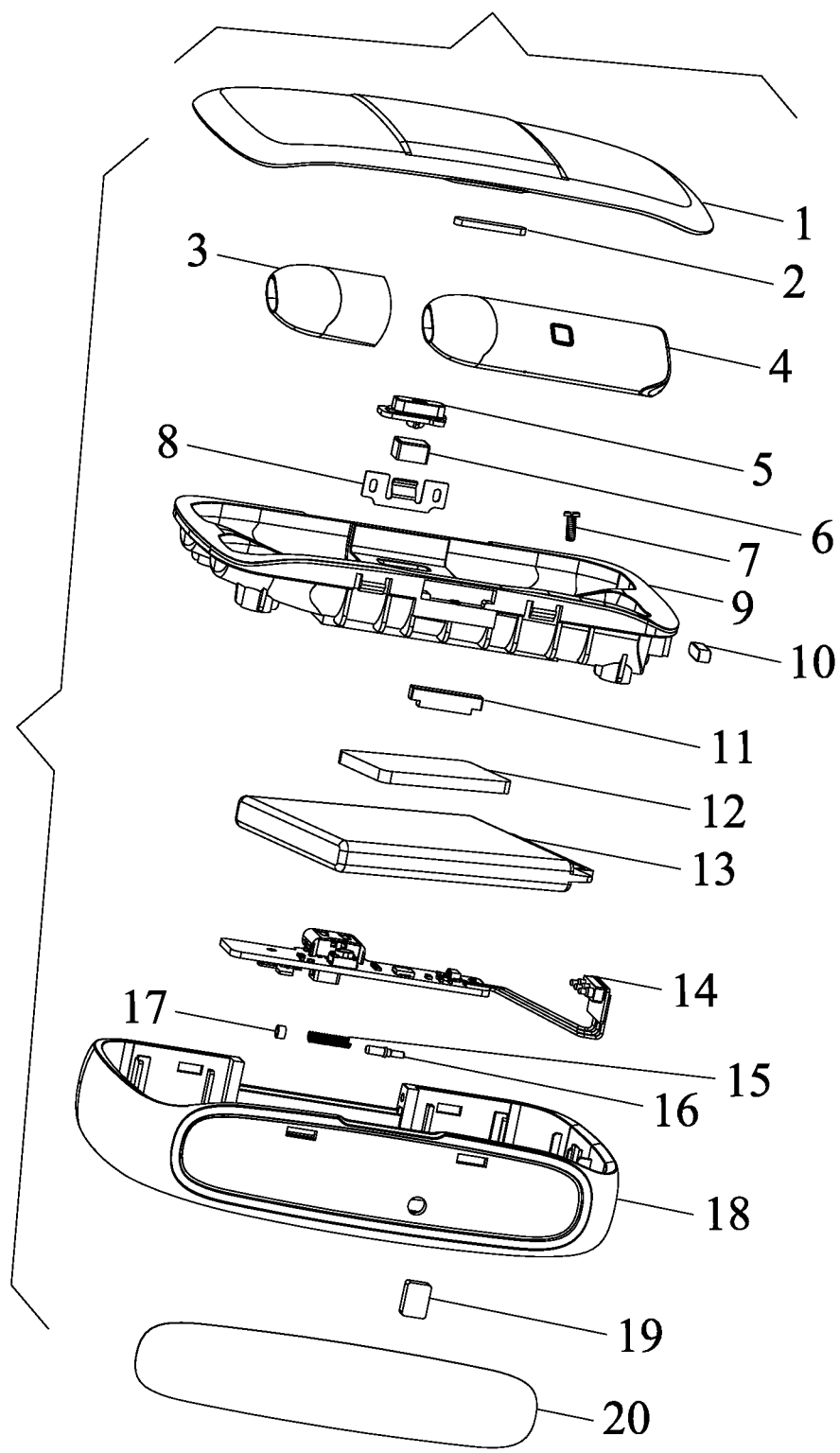
FIG. 1 is an exploded view of a battery box in accordance with one embodiment of the disclosure
Figure 2:
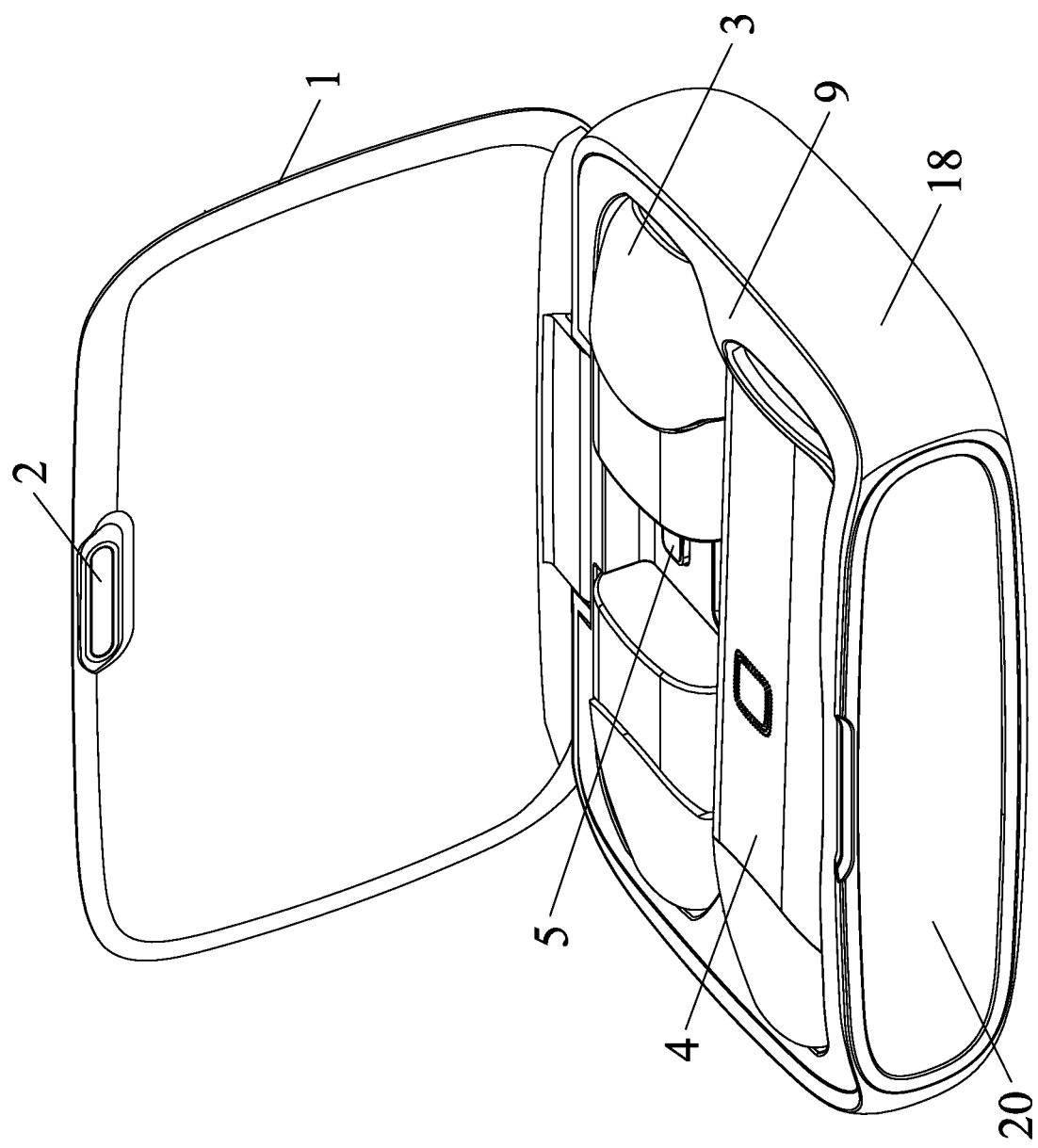
FIG. 2 is a schematic diagram of a battery box in accordance with one embodiment of the disclosure.
Figure 3:
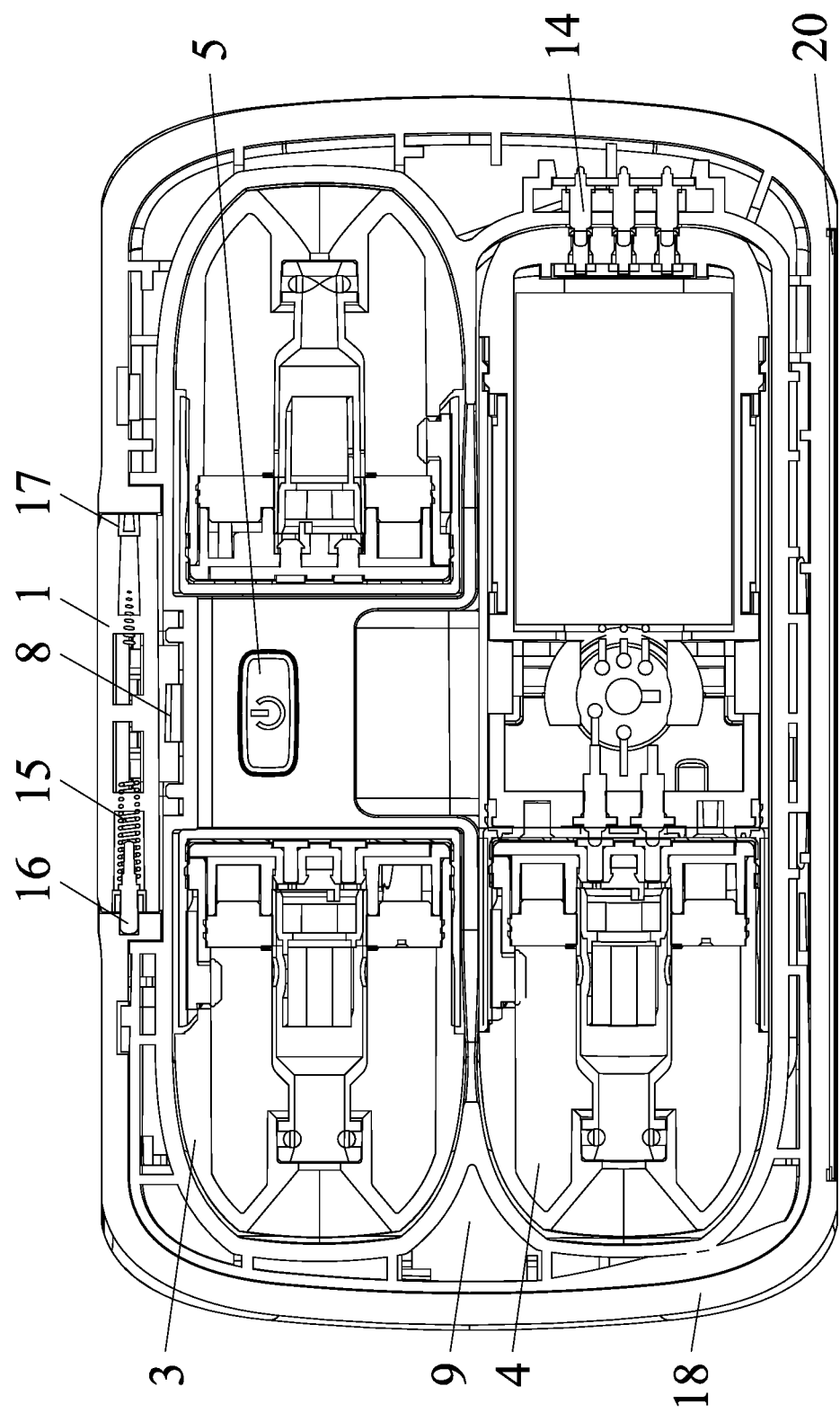
FIG. 3 is a sectional view of a battery box in accordance with one embodiment of the disclosure.

As shown in FIGS. 1-3, the disclosure provides a battery box comprising an end cover 1, a housing 18, and an elastic connector; the end cover 1 is disposed on the housing 18 and is connected to the housing 18 via the elastic connector; the elastic connector is configured to control an opening and closing of the end cover 1 with respect to the housing.

Specifically, the elastic connector comprises a spring 15, a rotation shaft 16, and a rivet 17; the spring 15 is disposed around the rotation shaft 16; the rotation shaft 16 comprises a first end and a second end; the rivet 17 is disposed on the first end to fix the spring 15; the rotation shaft 16 runs through the end cover 1 and two ends of the rotation shaft are exposed out of the end cover; and the spring 15 is configured to control the opening and closing of the end cover 1.

Specifically, the elastic connector further comprises a steel piece 8 and a support 9; the support 9 comprises a positioning slot and the steel piece 8 is vertically disposed in the positioning slot to prevent the automatic opening and closing of the end cover 1.

Specifically, the support 9 is fixed in the housing 18; the second end of the rotation shaft 16 is disposed in the housing 18.

Specifically, the elastic connector further comprises a first magnet 2 and a second magnet 11; the first magnet 2 is disposed in an inner side of the end cover; the second magnet 11 is disposed on the support 9; a magnetic attraction force between the first magnet 2 and the second magnet 11 strengths the closing of the end cover 1.

In certain embodiments, the elastic connector further comprises a third magnet 10 disposed on one side of the support 9 and configured to attract an electronic cigarette in a charging state.

Specifically, the battery box comprises an end cover 1, a first magnet 2, a backup cartomizer 3, an electronic cigarette 4, a power button 5, a silicone sleeve 6, a screw 7, a steel piece 8, a support 9, a second magnet 11, a third magnet 10, an ethyl vinyl acetate (EVA) gasket 12, a battery 13, a control panel 14, a spring 15, a rotation shaft 16, a rivet 17, a housing 18, a lamp cover 19, and a decorative plate 20. The first magnet 2 is fixed in the inner side of the end cover. The spring 15 is disposed around the rotation shaft 16; the rotation shaft 16 comprises a first end and a second end; the rivet 17 is disposed on the first end to fix the spring 15; the rotation shaft 16 runs through the end cover 1 and two ends of the rotation shaft are exposed out of the end cover. The end cover 1 is disposed on the housing 18 and the second end of the rotation shaft 16 is fixed in the housing 18. The input end of the control panel 14 is soldered on the positive and negative electrodes of the battery 13 and is fixed in the bottom of the housing 18. The EVA gasket 12 is pasted on the surface of the battery 13, and the battery 13 is fixed in the bottom of the housing 18. The support 9 comprises a positioning slot and the steel piece 8 is vertically disposed in the positioning slot to prevent an automatic opening and closing of the end cover 1. The second magnet 11 is disposed on the support 9; a magnetic attraction force between the first magnet 2 and the second magnet 11 strengths the closing of the end cover 1. The third magnet 10 is disposed on one side of the support 9 and firmly attracts the electronic cigarette in a charging state, thus improving the contact of the electronic cigarette and the charging contact. The silicone sleeve 6 is disposed around the power button on the control panel 14. The power button 5 is fixed in a groove on the surface of the support 9. The support 9 is disposed in the housing 18 and fixed with the screw 7. The lamp cover 19 is fixed in a slot of the housing 18. The decorative plate 20 is disposed on the front surface of the housing 18, and the electronic cigarette 4 and the backup cartomizer 3 are arranged in the support 9.

The following advantages are associated with the battery box of the disclosure:

1. The battery box comprises the elastic connector to control the opening and closing of the end cover with respect to the housing, which is easy to operate.

2. The first magnet is disposed in the inner side of the end cover; the second magnet is disposed on the support; the magnetic attraction force between the first magnet and the second magnet strengths the closing of the end cover.

3. The elastic connector further comprises the steel piece configured to prevent the automatic opening and closing of the end cover.

It will be obvious to those skilled in the art that changes and modifications may be made, and therefore, the aim in the appended claims is to cover all such changes and modifications.

What is claimed is:

1. A battery box, comprising an end cover, a housing, an electronic cigarette, a steel piece, a support, and an elastic connector; wherein:

the end cover is disposed on the housing and is connected to the housing via the elastic connector;

the elastic connector comprises a spring, a rotation shaft, and a rivet and the elastic connector is configured to control an opening and closing of the end cover with respect to the housing;

the spring is disposed around the rotation shaft, the rotation shaft comprises a first end and a second end, the rivet is disposed on the first end to fix the spring, the rotation shaft runs through the end cover and two ends of the rotation shaft are exposed out of the end cover, and the second end of the rotation shaft is disposed in the housing;

the support is fixed in the housing, and the support comprises a positioning slot on a side wall thereof;

the steel piece is vertically disposed in the positioning slot, and is disposed in a position adjacent to the spring, and the steel piece is configured to prevent an automatic opening and closing of the end cover; and the electronic cigarette is disposed in a cavity of the support.

2. The battery box of claim 1, wherein the elastic connector further comprises a first magnet and a second magnet; the first magnet is disposed in an inner side of the end cover; the second magnet is disposed on the support; a magnetic attraction force between the first magnet and the second magnet strengths the closing of the end cover.

3. The battery box of claim 1, wherein the elastic connector further comprises a third magnet disposed on one side of the support and configured to attract the electronic cigarette in a charging state.

* * * * *